United States Patent
Grossman et al.

(10) Patent No.: US 6,246,415 B1
(45) Date of Patent: Jun. 12, 2001

(54) METHOD AND APPARATUS FOR CULLING POLYGONS

(75) Inventors: Mark Stefan Grossman, Palo Alto; David Lloyd Morgan, Mountain View; Douglas Allen Voorhies, Menlo Park, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/069,971

(22) Filed: Apr. 30, 1998

(51) Int. Cl.[7] .................................................. G06T 15/40
(52) U.S. Cl. .......................... 345/422; 345/421; 345/427; 345/434; 345/435
(58) Field of Search .................................... 345/433, 434, 345/435, 421, 422, 427

(56) References Cited

U.S. PATENT DOCUMENTS

| 5,600,763 | * | 2/1997 | Greene et al. ........................ 345/420 |
| 5,751,291 | * | 5/1998 | Olsen et al. ......................... 345/422 |
| 5,877,773 | * | 3/1999 | Rossin et al. ........................ 345/434 |
| 5,949,423 | * | 9/1999 | Olsen ................................... 345/422 |
| 5,990,904 | * | 11/1999 | Griffin ................................. 345/435 |

OTHER PUBLICATIONS

Greene, Ned et al., "Hierarchical Z–Buffer Visibility" *Computer Graphics Proceedings, Annual Conference Series:* 231–238 (1993).

* cited by examiner

Primary Examiner—Mark Zimmerman
Assistant Examiner—Kimbinh T. Nguyen
(74) Attorney, Agent, or Firm—Stearne, Kessler, Goldstein & Fox, p.l.l.c.

(57) ABSTRACT

A method and apparatus provide for preserving hardware resources in connection with a display of complex scenes. Polygons which make up portions of the display can be culled prior to use of the hardware resources. An occlusion parameter for use in the culling operation can be determined in accordance with a monitoring of a plurality of tiles which constitute a display. In particular, a maximum depth value associated with a given tile can be utilized to indicate whether a subsequently received polygon or primitive would otherwise be occluded and should therefore be discarded or ignored rather than rasterized.

15 Claims, 4 Drawing Sheets

METHOD AND APPARATUS FOR CULLING POLYGONS

BACKGROUND OF THE INVENTION

The present invention is directed to a method and apparatus for reducing the load on hardware in a display system. More particularly, the present invention is directed to a method and apparatus for culling polygons from display data prior to rasterization of the display data.

Computer graphics processing devices have become more and more powerful with the result being that more and more complex graphics capabilities are being provided to enable the display of more and more complex visual data.

These complex graphical devices generate displays on a frame by frame basis. Each frame includes display data information for the picture elements or pixels of the display. In known systems graphics display data is provided as a plurality of polygons (often triangles) of display information dispersed across the pixels of the display. For instance, a picture of a house which might be shown on a display, such as shown in FIG. 1, would be constituted by thousands of tiny polygons having certain textural characteristics. The polygons are positioned on the display in accordance with the pixels to which they correspond. For example, FIG. 6 of the present application shows a block diagram of a high level representation of a number of elements utilized in displaying an image constituted by a plurality of these tiny polygons. In particular, a geometry engine 601 provides the polygon information along with space coordinate information for each of the polygons. A rasterizer 602 takes the polygon information and the space coordinate information and processes it so as to drive the display to appropriately place the polygon to cover picture elements on the display in the correct locations. Those skilled in the art should appreciate the fact that a rasterizer can be constituted by a number of rasterizer subsystems each responsible for rasterizing different portions of the display. The use of the term rasterizer throughout this specification is to intended to cover the single or multiple rasterizer component systems.

As graphics processing devices have become faster and faster, the amount of information which can be displayed over the course of a frame has grown dramatically. More and more polygons of visual data can be processed and rasterized. For example, regarding the picture of the house shown in FIG. I the display system could provide not only a display of the exterior of the house, but could also write the polygon information for the interior portions of the house or even for the area behind the house during the processing of a frame of information. The closer parts of the view of the image occlude, however, the back portions of the image, that is the exterior walls closer in view occlude the interior portions of the illustrated house. Displaying an image in this manner wastes hardware resources as the graphics machine expends computational power on display fragments that will not be seen. It would be beneficial if graphics devices could detect certain occlusion parameters with respect to a frame of information and utilize those occlusion parameters to reduce the waste of hardware resources. It would be especially beneficial if a small number of parameters could be used to avoid accessing the visibility information, such as depth values, that may be stored in conjunction with each picture element.

SUMMARY OF THE INVENTION

The present invention provides an improvement to graphics processing systems by defining and taking advantage of occlusion parameters. In an embodiment of the present invention a display is constituted by a plurality of display regions. Each region has associated therewith a maximum depth value. When visual data regarding a scene to be displayed, for instance a primitive which can be a polygonal portion of the display data, is received and is associated with a given area of the display, its depth value is detected and compared against the maximum depth value of the display region. If it is determined that the newly received polygon is deeper than the maximum depth value of the region, that is, behind previous rasterized primitives for each and every portion of the region of the display in interest, then that particular polygon is culled out of the stream of polygons. Thus, at a minimum, depending on where the culling operation is performed this operation of the present invention reduces a waste of the resources of the rasterizing portion of the device. In essence, information that will not contribute to the display is simply ignored or discarded. If the culling is done earlier in the processing operation other hardware resources could be conserved as well.

The present invention also provides a method and apparatus for determining values for controlling the culling process. In particular, the present invention provides a method and apparatus by which the display is divided into a plurality of display regions such as tiles which can be made up of a block of pixels. In fact, each pixel could be represented by multiple samples. As primitives or polygons representative of display information are received into the system, the polygon's display location is determined. In so doing the system identifies those tiles or regions upon which the polygon may have some effect. A maximum depth value for the polygon in the region is detected. This depth value is obtained by examining the depth values of any newly visible fragments in the region and noting the maximum. This depth value is compared to a maximum culling value for the tile as indicated by polygons that have previously written on or covered other portions of the tile. If this regional maximum depth value of the received primitive or polygon exceeds the maximum depth value then attributed to the tile, then the most recently received primitive's depth value is substituted for the maximum depth value. This operation is continued for a given tile until all of the pixels (or multi-samples) of that region have been covered by polygons in the process of displaying a particular frame of information. The maximum depth value of a given tile at the time that all of the pixels (or multi-samples) of the tile have been written on or covered is considered the culling or occlusion parameter in connection with subsequent primitives that are related to this tile. The occlusion parameter is then active and serves as a comparison value for any subsequently received primitives for that tile in the remainder of that frame of information. If the depth value of a subsequently received polygon is greater than the maximum depth value associated with the tile in the active occlusion parameter then that primitive or polygon is culled out and is not rasterized as in the first described aspect of the present invention.

In accordance with another aspect of the present invention, while an active occlusion parameter buffer operates in conjunction with a culling algorithm to cull or discard invisible fragments of the display represented by polygons that are "too deep into the display", those primitives which are not discarded, but which are sent on to be rasterized, may be used to update the occlusion parameter. This updated value, which would be even closer, that is, have a smaller maximum depth, for a given tile could further reduce the number of polygons which are processed.

In a disclosed embodiment of the present invention the culling operation is performed in connection with a pre-rasterizer. The pre-rasterizer can be located at the input portion of the rasterizer, at the output portion of a geometry engine, or it can be a stand-alone piece of equipment coupled somewhere between the geometry engine and the rasterizer. The pre-rasterizer thereby operates to cull (i.e., reject from) a stream of polygons only those which have no chance of making a contribution to a given graphical image.

It is further possible in accordance with the present invention to pre-sort the polygons in an effort to further enhance the benefits of the culling operation. The polygons could be pre-sorted based on their respective depth values such that polygons that are most likely to occlude others are drawn first.

As a result of the method and apparatus of the present invention hardware resources previously wasted in rasterizing occluded information can now be preserved.

DETAILED DESCRIPTION

Figure 1:
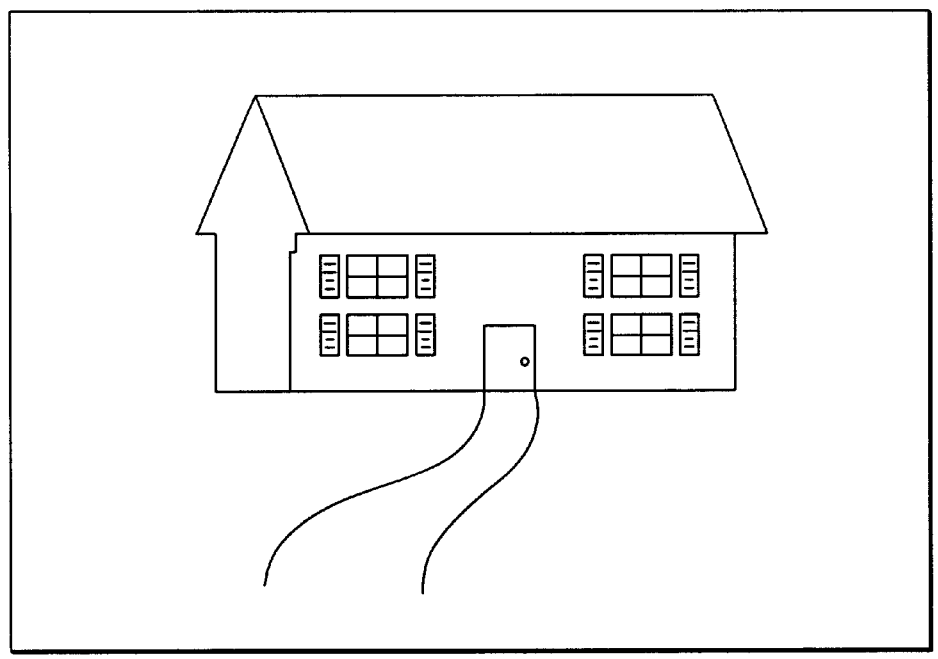
FIG. 1 provides a sample display which could be rasterized in an embodiment of the present invention or in the prior art.
Figure 3:
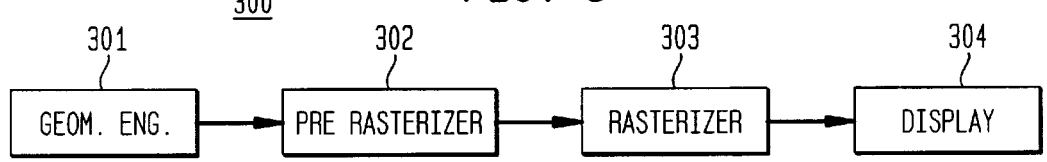
FIG. 3 illustrates a block diagram of an embodiment of the present invention.
Figure 4:
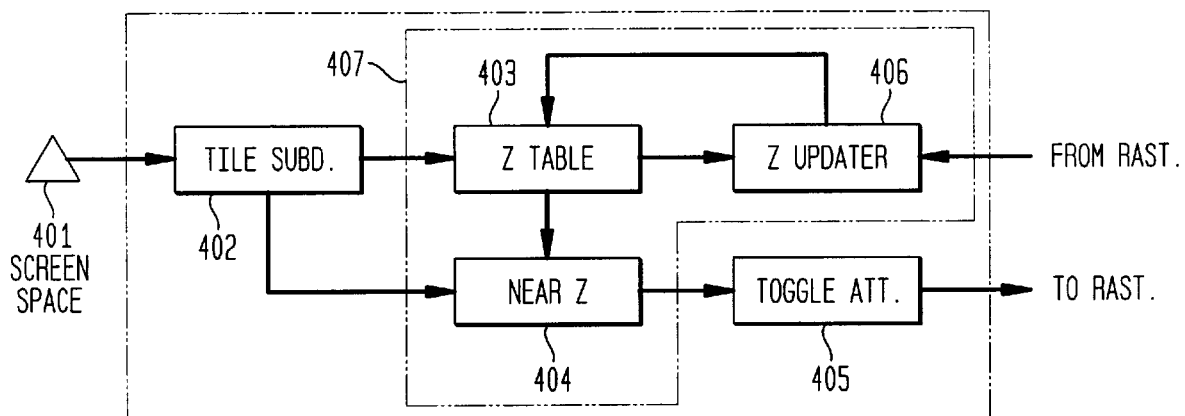
FIG. 4 illustrates a block diagram of detailed portions of a pre-rasterizer of the embodiment of FIG. 3.

As described above, the display image can be a complex scene. One such scene might be constituted by an element such as that shown in FIG. 1 where a great deal of information is actually provided not only with regard to the exterior portions of the house shown, but also the interior portions of the house. Because of the existence of the wall structure occluding the interior portions of the house from the view shown, unless some technique is used to cull out the occluded display data the system would otherwise process, including rasterize information which would simply not be visible to the viewer of the display. In accordance with an embodiment of the present invention, a pre-rasterizer 302 is included in a display system 300 shown in FIG. 3. The pre-rasterizer is positioned between the geometry engine 301 and the rasterizer 303. While the pre-rasterizer of FIG. 3 is illustrated as a distinct and separate device it should be recognized that the pre-rasterizer could in fact be provided in a different configuration. For example, the pre-rasterizer could be incorporated into the geometry engine itself thereby affecting the output of the geometry engine. Alternatively, the pre-rasterizer could be included in the input portion of the rasterizer 303. In either circumstance the pre-rasterizer can operate to cull out those parts of the display data referred to as primitives. This unit of display data can be constituted by polygons, such as triangles. The culled primitives would otherwise be occluded based on other information that is produced by the geometry engine. FIG. 4 illustrates in further detail elements of the pre-rasterizer and their relationship to elements of the rasterizer.

Figure 2:
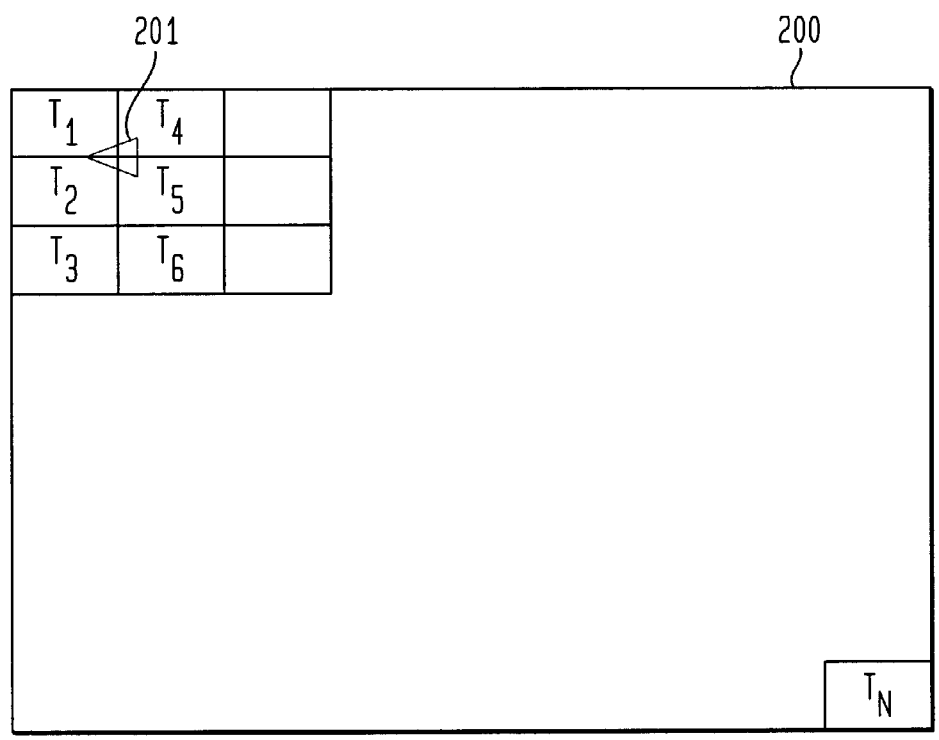
FIG. 2 illustrates an example of an arrangement of display regions in accordance with an embodiment of the present invention.

To facilitate the processing required in the present invention, the display, e.g., 200 in FIG. 2, can be thought of as being constituted by a plurality of regions or tiles. Each tile size portion corresponds to a block of picture elements or pixels where the block is of a predetermined size. In one example for implementing the present invention the display is divided into 1280 tiles and each tile is a 16×16 pixel screen tile. In accordance with the present invention primitives or portions thereof associated with a given tile are culled or discarded, if it is determined that those primitives are completely obscured by display data that is associated with that same tile and is already in a frame buffer for rasterization or has been forwarded to the frame buffer.

In one method for implementing the present invention a pre-rasterizer includes buffer space associated with each of the tiles that make up the display. Each tile buffer stores a maximum depth value associated with the pixels or multi-samples for that tile. This value can be as great as or greater than (farther than) a depth value of all of the pixels in that tile. A culling operation is performed by first determining the identity of those tiles associated with a received primitive. A depth value associated with the primitive is then compared to the maximum depth value for each tile in which the primitive is to appear. The primitive depth value is typically a minimum depth value associated with the primitive. If for a given one of the associated tiles the depth value of the primitive is greater than the maximum depth value of any pixel in that tile, that is, the primitive is completely occluded by all of the pixels in that tile, then the primitive's contribution to that tile is culled. The culling parameter or maximum depth value associated with a given tile may vary on a frame by frame basis. Therefore, for each frame the pre-rasterizer can detect a maximum depth value for a given tile and use that maximum depth value for all subsequent primitives presented to the same tiles, within the frame.

The pre-rasterizer keeps track of the maximum depth value associated with a given tile by checking a depth value for each received primitive that writes or covers one or more pixels within that tile that have not as yet been covered by any other primitives associated with that given frame. Thus, as the first primitive associated with a given tile is received, it may only cover a subset of the pixels or multisamples associated with that tile. That primitive will have associated with it a depth value which, since it is the first primitive to cover any portion of the tile, will be treated as the initial maximum depth value for the tile. As subsequent primitives for the tile are received, a number of determinations are made. First, it is determined whether the primitive covers any additional pixels not previously covered. It is also determined whether the depth value at any visible fragment belonging to the received primitive is greater than the presently stored maximum depth value for the tile. If both circumstances are true then the maximum depth value associated with the tile is modified to reflect the "deeper" or farther away element within the tile region. This assures that for a given frame the occlusion parameter will be estimated in a conservative manner. This will better assure that information is not lost at the expense of possibly forwarding a number of polygons to the rasterizer that will be occluded. This number is often significantly lower than would occur in the absence of the present invention.

Throughout the calculations and determinations and disclosures that follow it is presumed that the display has three orthogonal axes x, y and z where x and y form the axes along the plane of the display and z forms an axis into the displayed scene. Thus, as values along the z axis get larger as described below the indication is that the primitive is displayed deeper and deeper into the scene, farther and farther toward the back of the scene. Different nomenclatures might be provided for describing the relationship between the front and the back of the display. All that is necessary is to somehow reflect a depth of a primitive and a depth of the tile with respect to the front region of the display so as to represent a region or regions which may be occluded based on their depth position.

In a modification of the present invention the maximum depth value for a tile region, which will also be referred to as a "z culling value", can be updated not only on a frame-by-frame basis, but instead during the processing of a single frame. In this instance, it may be beneficial to then provide two different buffers for each tile region of the display. A first buffer would contain an active maximum depth or z culling value which can be used to make determinations on whether to discard or rasterize a primitive which covers at least part of a tile region. At the same time, a new maximum depth value or z culling value can be calculated for the tile region in much the same manner as the first maximum depth value was created. However, this updated value uses only the primitives which have not been culled. Therefore, the maximum depth value associated with these subsequently updated tile regions will either be the same as or less than the initially calculated maximum depth value.

Figure 5:
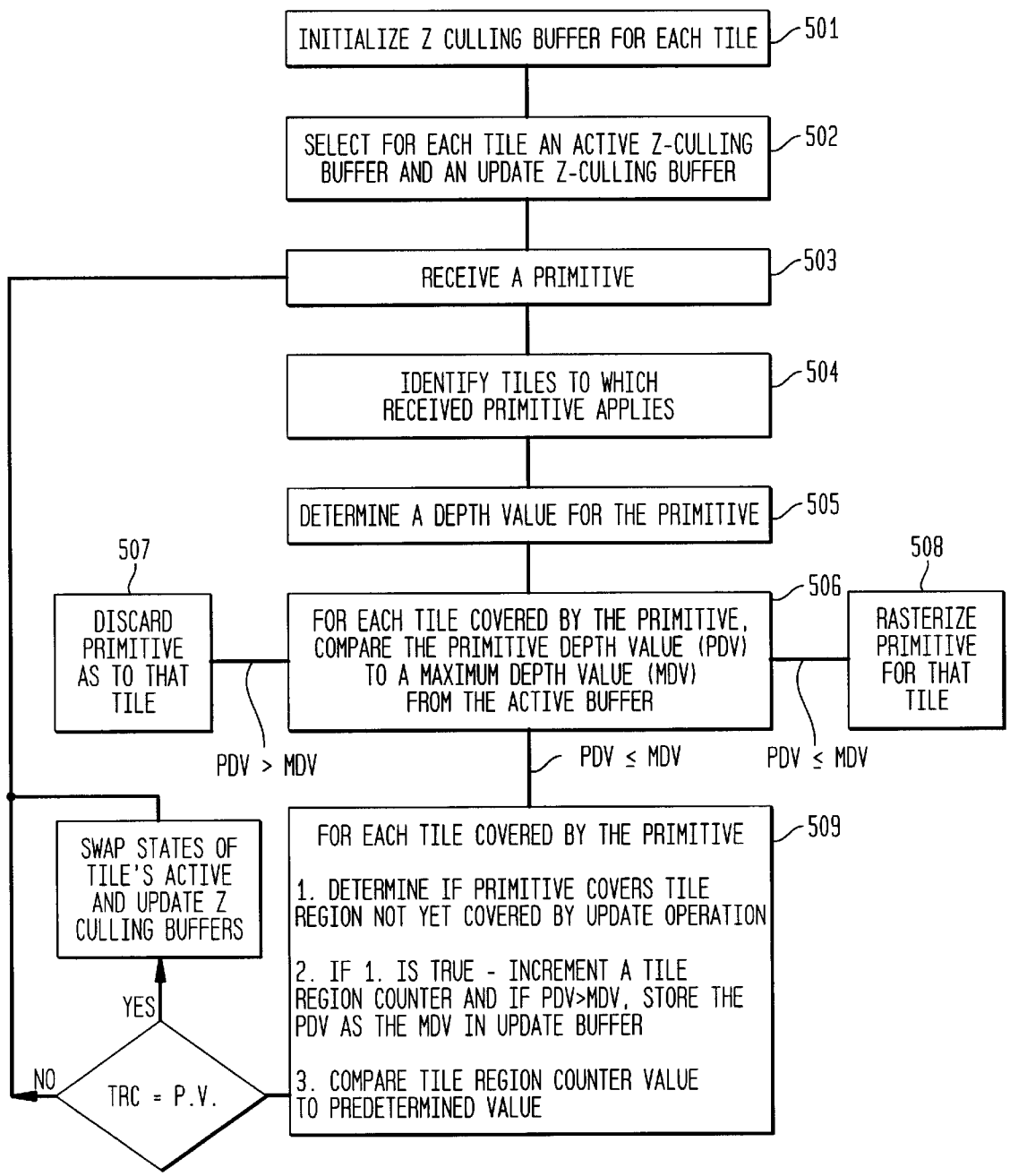
FIG. 5 is a flow diagram setting forth a method for processing display data in accordance with an embodiment of the present invention.
Figure 6:
FIG. 6 illustrates a block diagram of a prior art arrangement for a graphics display device.

FIG. 5 illustrates a flow diagram useful for describing a process for culling primitives in accordance with the present invention. It is presumed in accordance with the method of FIG. 5 that two buffers for storing z culling parameters (z culling buffers) are provided for each tile region of the display. At any one time one of the z culling buffers is considered active and the other is considered the updating buffer. The z culling buffer designated active is used as the buffer for determining which primitives should be culled and which primitives should be rasterized. Meanwhile, the updating buffer is used to determine a new maximum value for subsequent culling operations. Once the updating buffer has completed the updating operation the two z culling buffers can flip states so that the previously active buffer is used for updating and the buffer previously used for updating becomes the active buffer.

In the first step the z culling buffers for each tile are initialized, 501. One of the buffers is designated an active z culling buffer while another buffer associated with the tile is designated as an update z culling buffer. Thus, in the initial stages before any primitives have been received the value stored in the z culling buffer designated as active is set to a value corresponding to the deepest possible value of the display representation so as to enable all primitives that are received before a z culling value is determined to be rasterized. Also, a coverage counter associated with each tile or region is initialized to zero. Coverage detectors, one per pixel (or multisample) are initialized to their no-covered state and the updating buffer is initialized to the shallowest z value. After preparing the buffers primitives can be received, step 503. When a primitive is received the process identifies those tiles to which the received primitive applies, step 504. For instance, a given primitive may write over portions of multiple tiles. As an example, a primitive 201 located near the corners of adjacent tiles t1, t2, t4 and t5 of FIG. 2 may be identified as covering or writing into portions of each of these tiles. The process determines a depth value for the primitive, step 505. The depth value can be considered to be the closest vertex of the polygon constituting the primitive. For instance, assume that the primitive polygon is a small triangle. A depth value associated with the primitive would be the z value or depth of that vertex of the polygon which is closest to the front of the display. In the coordinate system in which the embodiment operates this would be the vertex with the nearest or smallest z value. Alternatively, the depth value for the primitive can correspond to a minimum depth over the display area of the primitive. In some circumstances this may provide an improvement in culling effectiveness, but it requires additional computations. Other valuation techniques may be employed so long as there is some way to express a relative depth of a primitive.

For each tile covered by the primitive the process, in step 506, compares the primitive depth value determined in step 505 to a maximum depth value associated with that tile in the active z culling buffer as selected in step 502. If the primitive depth value is greater than the maximum depth value for the tile in question, this indicates that the primitive is behind each and every portion of the tile and therefore is occluded within that tile and should be discarded, step 507. If, however, the primitive depth value is less than or equal to the maximum depth value as defined by the active z culling buffer then some part of the primitive is at least in the same plane or in front of one or more portions of the tile region and should be rasterized, step 508. This operation is continued for each tile covered by the primitive. When the active z culling buffer is in its initialized state all primitives which are received and which cover a given tile will be closer to the front of the display or have a primitive depth value less than the maximum depth value associated with that tile. All such primitives will therefore be rasterized. Primitives associated with a given tile will not experience culling until the tile's associated update z culling buffer has completed an update operation and has generated a new maximum depth value.

The calculation or determination of the new maximum depth value using the updating z culling buffer will now be described. The process flow in FIG. 5 indicates that a subprocess directed to updating the maximum depth value only utilizes those primitives for which the primitive depth value is less than or equal to the maximum depth value for the associated tile. Since at initialization the active z culling buffer will be set so that all received primitives will have a primitive depth value less than the maximum depth value for the associated tile, all primitives for a tile will be rasterized and presented to the updating subprocess until the maximum depth value for a given tile has been determined as set forth in the subprocess shown in step 509. Once a maximum depth value for a given tile has been determined and the state of the z culling buffers has been changed, that is the buffer previously designated as the update buffer has been changed to the active z culling buffer, only those primitives which are not occluded and therefore are not culled with respect to that tile region contribute to any subsequent update of the maximum depth value of the tile.

The subprocess for updating the maximum depth value is as follows. First, for each tile covered by the primitive the subprocess determines the newly covered picture elements (pixels or multisamples) and the maximum primitive depth value where it covers those newly covered portions of a tile. This is determined by detecting the pixels (or multi-samples) to which the primitive applies and checking to see whether those pixels (or multi-samples) have been written over or covered by any other primitives previously received during the course of the present update operation with regard to that tile. This is accomplished using the pixel coverage detectors. If the primitive provides any newly visible fragments in the region, i.e., covers a portion of the tile region which has not yet been covered during this particular update cycle, a tile region counter is incremented to reflect the number of previously uncovered pixels (or multi-samples) written on or covered by the present primitive. The maximum primitive depth value for that primitive is compared to the maximum depth value then stored in the update z culling buffer for that tile. If the primitive depth value exceeds that maximum depth value, the primitive depth value replaces the previously stored value and becomes the new maximum depth value in the update z culling buffer. If the primitive depth value is less than the maximum depth value of the update z culling buffer the primitive depth value has no impact upon the updating buffer. The subprocess then compares the value of the tile region counter to a predetermined value. For example, in a situation where a tile region comprises a 16×16 pixel array and the counter keeps track of the number of pixels written on or covered in the tile then the counter should be able to count up to 256. When the counter, which is incremented only when a pixel is first written or covered has been incremented to 256 then this is an indication that all of the pixels of that tile have been written on or covered in this update cycle. This is an indication that the detection of an updated z culling value has been completed. If the tile region counter value (TRC) equals the predetermined value (PV) as detected in the conditional step 510 then the process changes the status of the two buffers associated with the given tile. The buffer previously considered the updating buffer becomes the active buffer and the buffer previously considered the active buffer can be re-initialized and used as the updating buffer for the next updating cycle. A toggle bit, which in a 256-pixel tile example corresponds to the most significant bit of the tile region counter, can be used to indicate which of the buffers is active and which is in the update mode. The process then receives another primitive, returning to step 503. If the updating buffer has now become the active buffer, especially after the first calculation of a maximum depth value for a tile, then the operation of steps 506, 507 and 508 will become more meaningful as received primitives associated with that given tile may in fact be culled based on their primitive depth value. If the tile region counter value does not equal the predetermined value this indicates that the update cycle has not yet been completed. Again, the system returns to step 503 to receive another primitive.

The operation described above relates to the process for displaying data in connection with a single frame of a graphical display. At the beginning of each new frame the operation would begin again at step 501 initializing the z culling buffers for each tile. It should also be remembered that the primitives or polygons will not be provided in tile number order. For example, a primitive relating to tile T1 could be subsequently followed by a primitive related to tile T5 which could then be followed by another primitive related to tile T1 again. The ordering of the polygons in terms of their tile location is not performed in the system. Thus, at any given time in the processing of a frame data the updating cycles of the various tiles may vary dramatically. While in one circumstance a given tile may be entirely covered by the first few received primitives, another tile may have only a portion of its pixels (or multi-samples) covered for an extended portion of a frame thereby delaying the calculation of a maximum depth value for that given tile during that particular frame. It should also be recognized that the rates of calculating a given occlusion parameter or depth value for a given tile will vary from frame to frame as well.

Figure 7:
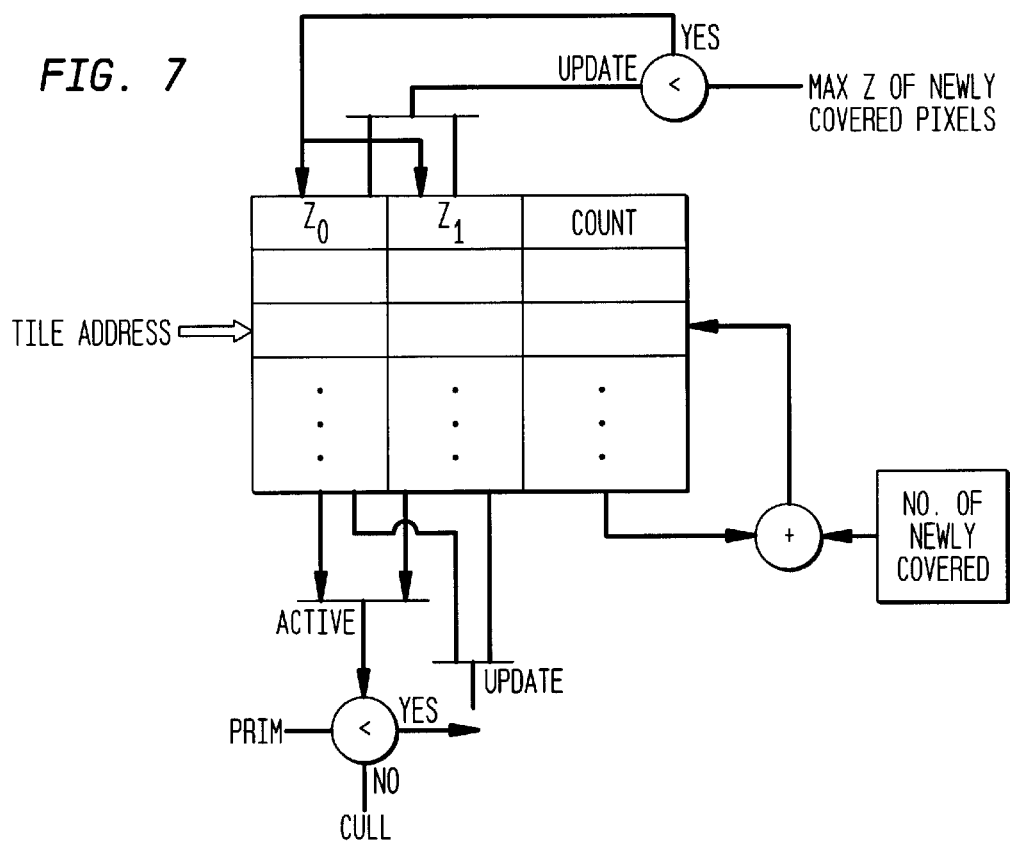
FIG. 7 illustrates a more detailed block diagram of elements in FIG. 4.

FIG. 4 represents in block diagram format an embodiment for a pre-rasterizer and its relationship to elements of a rasterizer. Polygons, such as represented by 401, and the screen space associated with those polygons are provided to a tile subdivider 402 in the pre-rasterizer. The tile subdivider 402 performs the functionality of determining those tiles to which the received primitive or polygon applies. A z table 403 includes a value of the maximum depth for a given tile. The z table would then be constituted by an array of the active z culling buffers or buffer entries which represent the maximum depth value for the respective tiles. The buffers can be implemented as a dedicated memory, a cache or other storage element. Also, the buffer need not hold full-precision depth values to be effective. One possible example of such a table is shown as element 702 of FIG. 7. Here each tile has associated with it three parameters a $Z_0$ value, a $Z_1$ value and a tile count value. $Z_0$ and $Z_1$ are Z values and at any given time one of those values is active and the other is the update value. The count is a value indicative of the number of portions of the tile, such as pixels or multisamples for example,, which have been covered during the course of the current update operation. Of course this information need not be stored in tabular form so long as it is properly associated with its respective tile. The "near z" 404 uses the primitive information passed from the tile subdivider 402 and the coarse z culling information from Z table 403 accessed using tile addresses determined by the subdivider to filter out or cull out polygons which will be occluded and passes on those polygons or primitives which are not occluded as represented by the information in the coarse z culling table. The near z operation is represented in FIG. 7 by the comparator 704 which receives the primitive from the tile subdivider and the maximum depth value for the tile to which the primitive corresponds from the active z buffer for that tile. The comparator compares the closest z value for the primitives to the maximum depth value. If the primitive is entirely behind the maximum depth value, that is its closest z value exceeds the maximum depth value, the primitive is culled. If not the primitive is passed on for further processing. The primitives which are passed on are then passed to the pixel rasterizer (not shown) which develops information for updater 406 used to update the z table and ultimately for a frame buffer associated with the rasterizer. It is the information in the latter buffer which forms the display information for a given frame. The z buffer information is used in connection with the updating of the occlusion parameter for a given tile. The updater 406, shown more specifically as comparator 706 in FIG. 7, receives from the rasterizer the maximum z value associated with the newly covered pixels of a particular tile. The update value for that tile is retrieved from the z-table 703. If the maximum z value received from the rasterizer exceeds the value retrieved from the z table that maximum z value is used to update the table; if not it is ignored.

Updating is in part made possible by the buffer keeping track of the pixels (or multisamples) of a tile region that have already been covered during an update operation. For example, a single bit could be associated with a pixel and when that pixel has been covered the state of the bit can change, such as from "0" to "1". When all of the pixels' bits have changed state this corresponds to the count of the z table reaching a predetermined value. Just as a toggle bit in the most significant bit of the count can indicate which z buffer for that tile is active, a toggle bit, different from the state of the freshly covered pixel bit state can be attached to the next group of primitives to be written to that tile space. This toggle attachment function is performed by toggle bit attacher 405. Thus, as the count indicator changes the state of the z-buffers, the toggle bit attacher changes the toggle bit attached to the primitives for that tile that are passed on to the rasterizer. If the z-buffer has "1"'s for all of the pixels, indicating that all of the pixels were covered in the most recent update then the toggle attacher provides a "0" to the primitive. That attached toggle bit will cause the z-buffer entry for the appropriate pixels to change state to "0" and note that those pixels are newly covered in the present updating operation. This is simply one example of how the system can keep the z-buffer and the updating mechanism in sync. Other techniques which assure that the updater is receiving relevant and accurate updating information from the z-buffer can be employed and still practicing the invention of coarse z culling and updating z culling parameters.

In the description of the illustrated embodiments it has been indicated that the pre-rasterizer can be located at the geometry engine or at the rasterizer. The advantage of having the pre-rasterizer located at the geometry engine is that it conserves the bandwidth needed for the transmission or sending of primitives from the geometry engine to the rasterizer. Only those primitives which have not been culled or discarded are passed on and take up bandwidth between the geometry engine and the rasterizer. One countervailing consideration is the relative complexity and/or increased cost of transmitting update information from the rasterizer to the geometry engine so that the pre-rasterizer and the geometry engine can perform the updating cycles which have been described above.

The processing time of the coarse z culling operation can be enhanced by employing a technique called speculative querying. This relates to the relationship between the subdivider and the active z buffer portion of the z table. More specifically the subdivider breaks down the primitive trying to first determine its boundaries, then the tiles which are at least partially within those boundaries and then the exact pixels (or multisamples) within each tile that are to be covered. During the subdividing process, before the exact tiles are identified the subdivider can identify tiles near to the boundary which may or may not be covered as determined by further subdivider processing. The subdivider at that time can issue a query to the z-table to retrieve z culling parameters from the active z buffers for all of these near tiles. If upon further subdivision the near tile is in fact one of those within the primitive boundary, the near z culling module will have the necessary parameter. If the near tile turns out to be outside of the primitive the z information is ignored. This amounts to a speculative query to the z-table, retrieving z culling parameters that in some instances may not be used so as to have available as soon as possible values that will be used. Further description regarding the subdividing operation will help to illuminate this point. First it is noted that in one embodiment the subdivider could be broken down into two logical blocks, one that subdivides a screen down to the tile level, for example a 16×16 block of pixels, and a second that subdivides the tiles down to a 2×2 (quad level) for rasterization.

A basic recursive subdivision algorithm could be described as follows: void subdivide (int edgeval, int edgedx, int edgedy, int x, int y, int level)

```
int cornerbl = edgeval;
int cornerbrm = edgeval + (edgedx >> 1);
int cornerbr = edgeval + edgedx;
int cornerml = edgeval + (edgedy >> 1);
int cornermm = edgeval + (edgedx >> 1) + (edgedy >> 1);
```

```
int cornermr = edgeval + edgedx + (edgedy >> 1);
int cornerti = edgeval + edgedy;
int cornertm = edgeval + (edgedx >>) + edgedy;
```
//the above code evaluates the edge equation at the 9 corners of a
//2 × 2 patch
int patchbl =
(cornerbl >= 0) || (cornerbm >=0)||(cornerml>=0) || (cornermn >
int patchbr =
(cornerbm >= 0) || (cornerbr >=0)||(cornermm>=0) || (cornermr >
int patchtl =
(cornerml >= 0) || (cornermm >=0)||(cornertl>=0) || (cornertm >
int patchtr =
(cornermm >= 0) || (cornermr >=0)||(cornertm>=0) || (cornertr >
//the above code determines which of the 4 subpatches are covered by
//the edge equation. A subpatch is "covered" when any one of the
//corners has a non-negati edge equation evaluation
if (patchbl)
{
    if (level == 0)
        drawpixel (x, y, cornerbl, edgedx, edgedy);
    else
        subdivide (cornerbl, (edgedx >> 1), (edgedy >> 1), x, y,
(level–1));
if (patchbr)
{
    if (level == 0)
        drawpixel ((x + 1), y, cornerbm, edgedx, edgedy);
    else
        subdivide (cornerbm, (edgedx >> 1), (edgedy >> 1), (x+1), y,
(level–1));
}
if (patchtl)
{
    if (level == 0)
        drawpixel (x, (y+1), cornerbm, edgedx, edgedy);
    else
        subdivide (cornerml, (edgedx >> 1), (edgedy >> 1), x, (y+1),
(level–1));
{
//this last block of code implicitly defines the scan order
//(by what subpatches we evaluate in which order). If the level is zero
//(i.e. 2 ^ patch width == 1), then we spit out pixels.
//Otherwise, we recurse.
}
The zero'th step of recursive subdivision would be to invoke subdivide:
int width = log2 (managed_area_width);
//we assume a square managed area
subdivide (edgeval, (edgedx << width), (edgedy << width), 0, 0, width);

For the actual implementation, there may be some differences from this general-purpose algorithm:

Not all patches may be subdivided 2×2. The actual subdivision breakdown could be

4×4
4×4
4×4
4×4
8×8
1×2

The actual implementation includes a pipeline stage for each level of recursion (e.g., 7 levels to subdivide from 8 k×8 k to 2×1 pixels).

The edge equations are normalized prior to subdivision and denormalized following subdivision to enable reduced-precision corner evaluation.

A few details of the implementation should be mentioned in this description of the recursive subdivision.

The edge equation of a segment is the cross product of a fragment P (x, y) with its end points. The edge equation of a line segment AB is:

$$e=(yb-ya)*x+(xa-xb)*y+(xb*ya-xa*yb)$$

Its value represents the area of the triangle PAB. It also indicates which side of the line P(x,y) is on: negative on the left, positive on the right, and zero on the line segment. The above equation can be re-written as a linear equation in x,y:

$$e=u*x+v*y+eo$$

u and v are the horizontal and vertical vectors, respectively, co is the value of e at the origin (x+0, y=0).

Edge equations can be used in rasterization of a primitive. For a clockwise triangle, a fragment P is inside a triangle if all three edge equations evaluated at P are greater than or equal to zero. On the other hand, for a counter clockwise triangle, P is inside if all three edge equations evaluated at P are less than or equal to zero.

In a screen subdivision algorithm, a patch is subdivided into smaller subpatches and a subpatch is rejected if it does not include the primitive. Using the above edge equation property, a patch is not included if all four corners lie outside one of the three edges or all four corners lie outside the bounding box of the triangle. The second condition is necessary to prevent false inclusion.

Using full precision during scan conversion is very expensive. One way to reduce cost is to normalize the edge equations and to reduce their precision. This is at the expense of over scanning more fragments which have to be rejected later. For an edge AB, its edge equation is bounded by the values at the four corners of the screen. If a corner C produces the largest value, then area (ABC)=length of AB * perpendicular distance of C from AB If one keeps n msb of the edge equation after normalization, the error can be found as:

$$2^\wedge\text{-n*area (ABC)=error*length of AB}$$

$$\text{error=distance of C from AB*}2^\wedge\text{-n}$$

The maximum possible distance of C from AB is across the whole screen (2^13). If n=16, the amount of over scanning is ⅛ of a pixel away from an edge. In order to prevent fragments from under scanning, the normalized edge equations are rounded up by adding one to their lsb's.

It has also been considered that there may be advantage in pre-sorting the polygons based on their respective depth values. This may enhance the overall performance of the culling operation. In fact, if the parameters were drawn from front to back, that is pre-sorted with closer z value primitives processed first the coarse z culling technique of the present invention could provide benefits even without providing for any updating of the culling or occlusion parameters. Pre-sorting occurs, however, at the expense of processing power for performing the sorting operation. The advantage to be obtained in pre-sorting will vary from display to display or from display data to display data. Therefore, pre-sorting may not be a universally advantageous arrangement.

The present invention provides an improvement in usage of hardware resources in graphical display systems. In particular, the present invention discerns those polygons which are likely to be occluded by other polygons or primitives in the display and disregards them, thereby taking them out of the processing loop. This is a accomplished by monitoring depth values associated with various regions in the display. These values can be updated multiple times during the course of the preparation of display data in connection with the given frame of information. As a consequence, the present invention can significantly enhance the performance of the graphical display device with which it is associated.

What is claimed is:

1. A method for processing data that includes a plurality of primitives, the method comprising the steps of:
    a) determining an occlusion parameter for a region of the display, said step of determining including the substeps of,
        1) receiving depth data for a portion of a primitive to be mapped to said region,
        2) detecting whether said portion is to be mapped to a part of said region that has been as yet uncovered,
        3) if said detecting substep indicates said portion is to be mapped to an uncovered part of said region, updating an indication of the extent to which the region has been covered, and determining whether said depth data for said portion exceeds a depth data associated with said region, and if so the depth data associated with said region is updated with said depth data for said portion of said primitive, and
        4) detecting whether all of said region has been covered, and if it has been covered treating said depth data for said region as a maximum depth data for said region and if the entire region has not been covered repeating steps a) 1), a) 2), and a) 3);
    b) receiving a subsequent primitive;
    c) determining that at least part of said subsequent primitive is to be mapped to said region;
    d) determining whether to display said at least part of said subsequent primitive based on said maximum depth data for said region.

2. In a system for culling primitives from being rasterized, a method for determining an occlusion parameter for use in the culling operation, the method including the steps of:
    a) initializing a buffer associated with a rasterizing region that includes a plurality of display units;
    b) initializing a count associated with said rasterizing region;
    c) receiving a primitive;
    d) determining those display units of said rasterizing region associated with said primitive;
    e) detecting whether all of said display units associated with said primitive have been mapped to by an earlier received primitive and if not,
        updating said count to account for the number of display units mapped to by said primitive which had previously been unmapped, and
        updating said buffer if a depth value from said primitive exceeds a depth value for said rasterizing region previously stored in said buffer;
    f) repeating steps c), d) and e) until said count reaches a predetermined threshold wherein said buffer entry at the time said counter reaches said predetermined threshold constitutes the occlusion parameter.

3. The method of claim 2 comprising the further steps of: when said count reaches said predetermined threshold,
    g) receiving another primitive;
    h) determining those display units of said region associated with said another primitive; and
    i) discarding a portion of said another primitive associated with said region if a depth value associated with said portion of said another primitive of said depth value exceeds said occlusion parameter.

4. The method of claim 3 comprising the further steps of:
    k) initializing a second buffer associated with said rasterizing region;

l) re-initializing said count;

m) detecting whether all of said display units associated with said another primitive have been mapped to by a primitive received earlier in an update process and, if not, updating said count to account for the number of display units mapped to by said another primitive which had previously been unmapped, and updating said second buffer if a depth value for said another primitive exceeds a depth value for said rasterizing region previously stored in said second buffer; and n) repeating steps g), h) and m) until said count reaches a predetermined threshold wherein said second buffer entry at the time said count again reaches said predetermined threshold constitutes an updated occlusion parameter if said second buffer entry does not exceed the occlusion parameter.

5. The method of claim 3 wherein said display unit comprises a pixel.

6. The method of claim 3 wherein said display unit comprises a multi-sample of a pixel.

7. The method of claim 2 wherein said display unit comprises a pixel.

8. The method of claim 2 wherein said display unit comprises a multi-sample of a pixel.

9. The method of claim 4 wherein said count includes an indicator that identifies which of said first and said second buffer is to be used for determining whether to discard a primitive.

10. The method of claim 9 wherein said indicator comprises a bit that toggles whenever the count reaches the predetermined threshold.

11. A system for processing display data comprising:

a display data subdivider, an occlusion parameter memory;

a depth comparator coupled to said display data subdivider and said occlusion parameter memory; and an occlusion parameter updater coupled to said occlusion parameter memory.

12. The system of claim 11 further comprising:

a rasterizer coupled to said depth comparator, wherein said rasterizer writes to a display on a region by region basis.

13. A system for processing display data comprising:

a display data subdivider;

an occlusion parameter memory;

a depth comparator coupled to said display data subdivider and said occlusion parameter memory;

a rasterizer coupled to said depth comparator, wherein said rasterizer writes to a display on a region by region basis; and wherein said occlusion parameter memory includes a plurality of addressable spaces, wherein each region of a display has an addressable space in said memory associated therewith.

14. The system of claim 13 further comprising an occlusion parameter updater coupled to said occlusion parameter memory.

15. A system for displaying data on a display, comprising:

a plurality of rastrizesrs, each rasterizer corresponding to a plurality of regions of the display; and a plurality of display data depth analyzers, each analyzer including, a display data subdivider, an occlusion parameter memory, a depth comparator coupled to said display data subdivider, said occlusion parameter memory and one of said plurality of rasterizers, and an occlusion parmeter updater coupled to said occlusion parameter memory.

* * * * *